US010467387B2

(12) United States Patent
Thomee et al.

(10) Patent No.: US 10,467,387 B2
(45) Date of Patent: Nov. 5, 2019

(54) COMPUTERIZED SYSTEM AND METHOD FOR MODIFYING A MEDIA FILE BY AUTOMATICALLY APPLYING SECURITY FEATURES TO SELECT PORTIONS OF MEDIA FILE CONTENT

(71) Applicant: OATH INC., New York, NY (US)

(72) Inventors: Bart Thomee, San Francisco, CA (US); Lyndon Kennedy, San Francisco, CA (US); Ioannis Kalantidis, San Francisco, CA (US)

(73) Assignee: OATH INC., New York, NY (US)

( * ) Notice: Subject to any disclaimer, the term of this patent is extended or adjusted under 35 U.S.C. 154(b) by 201 days.

(21) Appl. No.: 15/190,315

(22) Filed: Jun. 23, 2016

(65) Prior Publication Data
US 2017/0372046 A1    Dec. 28, 2017

(51) Int. Cl.
| | | |
|---|---|---|
| *G06F 21/00* | (2013.01) | |
| *G06F 21/14* | (2013.01) | |
| *G06F 21/62* | (2013.01) | |
| *G06F 21/84* | (2013.01) | |
| *G06F 21/31* | (2013.01) | |
| *G06Q 30/02* | (2012.01) | |

(Continued)

(52) U.S. Cl.
CPC .......... *G06F 21/14* (2013.01); *G06F 16/9017* (2019.01); *G06F 21/31* (2013.01); *G06F 21/6218* (2013.01); *G06F 21/84* (2013.01); *G06Q 30/0277* (2013.01); *H04L 63/0442* (2013.01); *H04L 63/08* (2013.01); *G06F 2221/0748* (2013.01)

(58) Field of Classification Search
CPC ........ G06F 21/10; G06F 21/14; G06F 21/125; G06F 17/30038; G06F 17/30153
See application file for complete search history.

(56) References Cited

U.S. PATENT DOCUMENTS

| | | | | |
|---|---|---|---|---|
| 2016/0171239 A1* | 6/2016 | Li | .................... | G06F 21/6245 713/189 |
| 2016/0191472 A1* | 6/2016 | Ghafourifar | ........ | H04L 63/0428 713/167 |

(Continued)

*Primary Examiner* — Ghazal B Shehni
(74) *Attorney, Agent, or Firm* — James J. DeCarlo; Greenberg Traurig, LLP

(57) ABSTRACT

Disclosed are systems and methods for improving interactions with and between computers in content providing, generating, securing and/or hosting systems supported by or configured with personal computing devices, servers and/or platforms. The systems interact to identify and retrieve data within or across platforms, which can be used to improve the security and quality of data used in processing interactions between or among processors in such systems. The disclosed systems and methods provide added security features and functionality to media files through computerized, automated encoding and decoding of portions of media file content such that identified portions of the content are obfuscated upon display and communication to other users. The disclosed systems and methods provide a novel, computerized security feature(s) that protects data of media files from unintended exposure to third parties. The disclosed security features automatically prevent personal and/or private information from unwanted viewing and access from unauthenticated users.

20 Claims, 10 Drawing Sheets

(51) Int. Cl.
*G06F 16/901* (2019.01)
*H04L 29/06* (2006.01)

(56) References Cited

U.S. PATENT DOCUMENTS

2016/0191513 A1* 6/2016 Tomlinson .............. H04L 9/321
   713/168
2016/0191853 A1* 6/2016 Waisbard ........... H04N 21/4353
   725/31

* cited by examiner

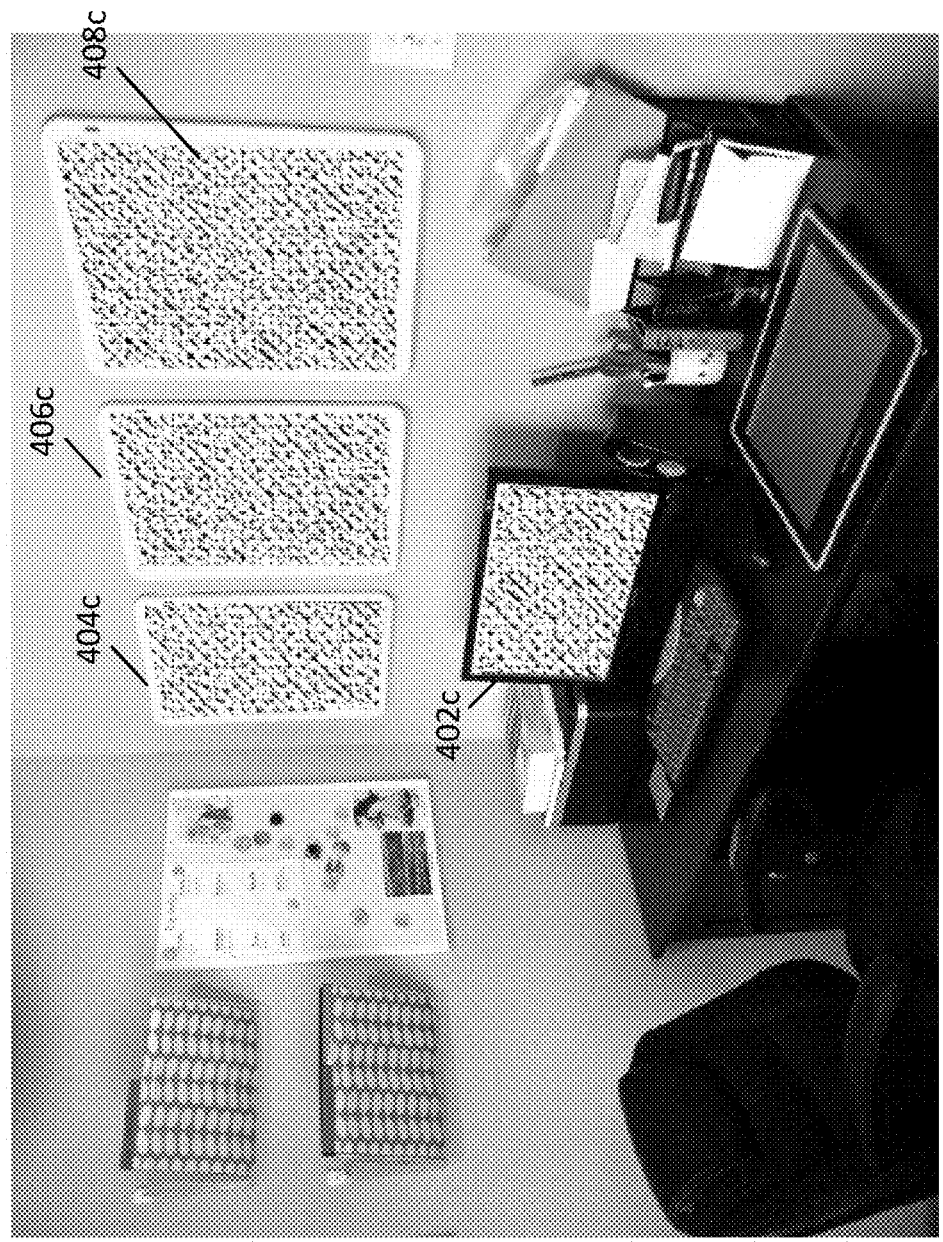

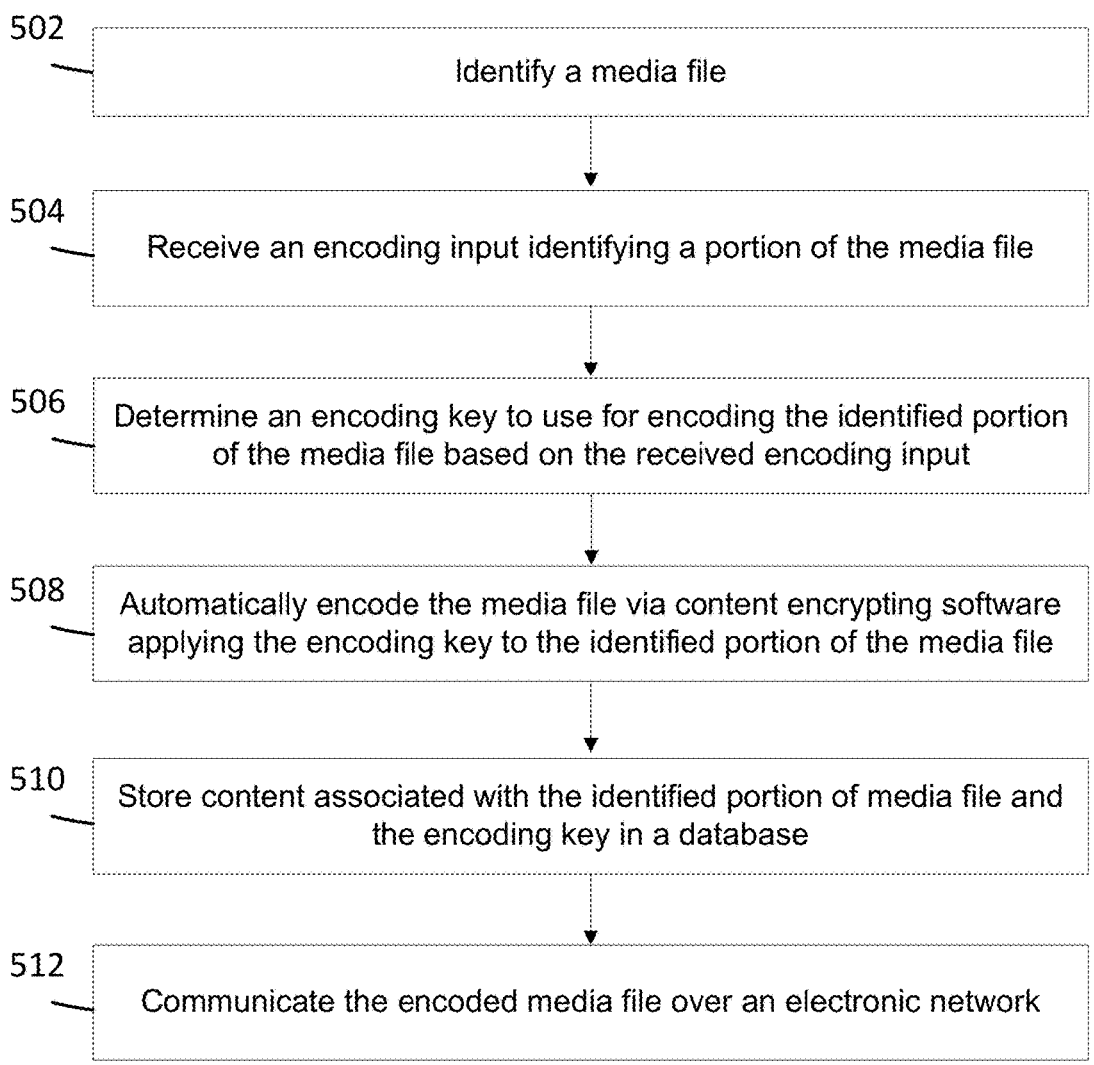

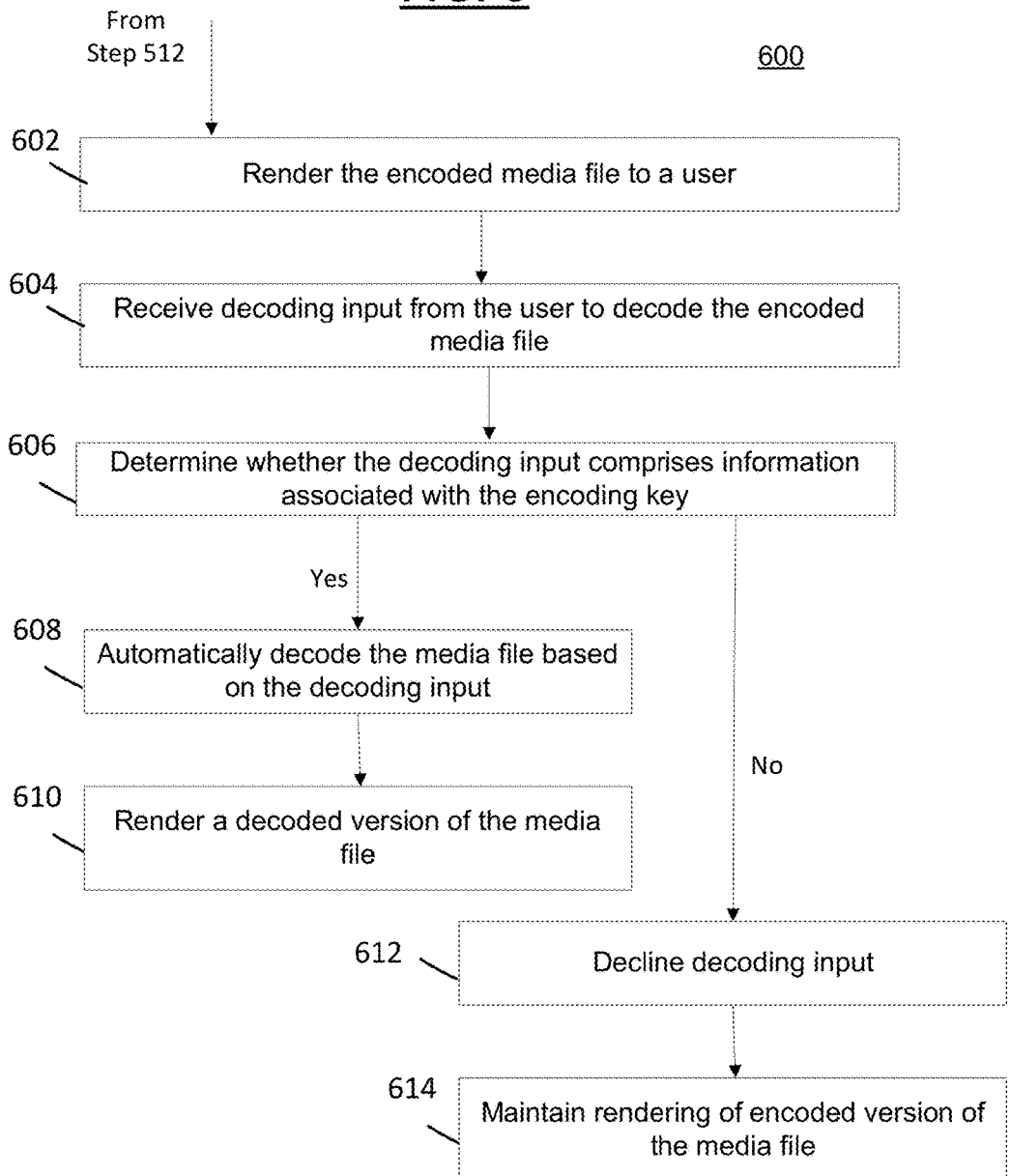

COMPUTERIZED SYSTEM AND METHOD FOR MODIFYING A MEDIA FILE BY AUTOMATICALLY APPLYING SECURITY FEATURES TO SELECT PORTIONS OF MEDIA FILE CONTENT

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates generally to improving the performance of content providing, generating, securing and/or hosting systems and/or platforms by modifying the capabilities and providing non-native functionality to such systems and platforms by enabling advanced security functionality to be applied to electronic media content via computerized privacy techniques that secure or obfuscate some or all of the content within the media file.

SUMMARY

The present disclosure provides computerized systems and methods for encoding and decoding portions of media file content such that identified portions of the content are obfuscated upon display and communication to other users. The disclosed systems and methods provide a novel, computerized security feature(s) that protects data of media files from unintended exposure to third parties. The disclosed security features automatically prevent personal and/or private information from unwanted viewing and access from unauthenticated users.

According to some embodiments of the instant disclosure, computerized systems and methods are disclosed which enable selective obfuscation of certain content (e.g. a face) present within a media object, such as a photo, video or audio file. As discussed herein, the computerized obfuscation is performed by reversibly encoding/encrypting (referred to as "scrambling" or "randomizing," as understood by those of skill in the art) a selected portion of content within a media file so that the media or portion thereof appears visibly obfuscated upon display by blanking, scrambling or otherwise affecting the rendering of the media to impair its visibility to an observer of the media.

In some embodiments, different pieces of content may be encoded using one or more keys, while the decoding of the content may only occur upon user or device being provided or granted access to a required decoding key(s).

As discussed herein, the computerized encoding and decoding (e.g., security) systems and methods are compatible with any known or to be known encoding/decoding scheme, such as, for example, public-private key-based encryption or any commercial-off-the-shelf (COTS) product for securing digital information. The disclosed systems and methods are highly suitable for sharing media objects containing privacy-sensitive content, where encoding of the content can be performed before the media object is shared on an external platform, while decoding can only performed by authorized people (e.g. friends and family) who are in possession of a decoding key.

It will be recognized from the disclosure herein that embodiments of the instant disclosure provide improvements to a number of technology areas, for example those related to systems and processes that handle or process content communications, such as but not limited to, electronic social networking platforms, media file hosting and/or generating platforms, email or other types of known or to be known content generation, hosting and/or communication platforms, and the like, whether embodied as a local and/or web-based application or platform. The disclosed systems and methods effectuate novel, increased security and user privacy within all ways users communicate, receive, render and store information. As evidenced from the discussion herein, this reduces the risk that a user's private or personal information will fall victim to unnecessary or unwanted exposure. Therefore, users will be provided a novel, secure online experience which will enable users to communicate information more freely and more securely.

In accordance with some embodiments, a method is disclosed which includes enabling advanced security functionality to be applied to electronic media content via computerized privacy techniques that secure or obfuscate some or all of the content within the media file, as discussed herein.

In accordance with one or more embodiments, a non-transitory computer-readable storage medium is provided, the non-transitory computer-readable storage medium tangibly storing thereon, or having tangibly encoded thereon, computer readable and executable instructions that when executed cause at least one processor to perform a method enabling advanced security functionality to be applied to electronic media content via computerized privacy techniques that secure or obfuscate some or all of the content within the media file.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIGS. 4A-4C illustrate non-limiting example embodiments in accordance with some embodiments of the present disclosure;

FIG. 5 is a flowchart illustrating steps performed in accordance with some embodiments of the present disclosure;

FIG. 6 is a flowchart illustrating steps performed in accordance with some embodiments of the present disclosure;

DESCRIPTION OF EMBODIMENTS

Figure 1:
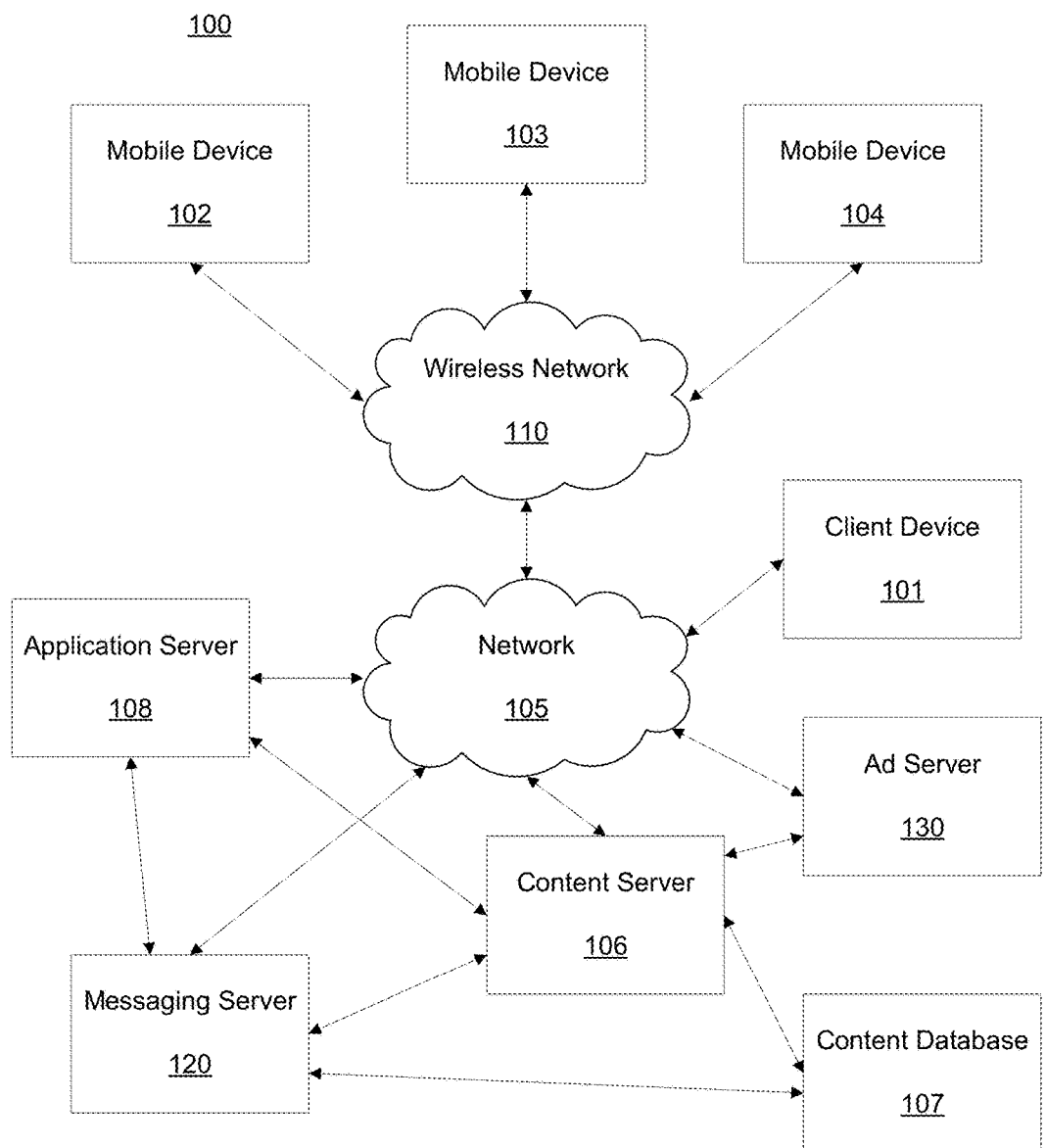
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a wired or wireless line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly.

A wireless network may further employ a plurality of network access technologies, including Wi-Fi, Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or sender or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations. For example, a simple smart phone, phablet or tablet may include a numeric keypad or a display of limited functionality, such as a monochrome liquid crystal display (LCD) for displaying text. In contrast, however, as another example, a web-enabled client device may include a high-resolution screen, one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like.

A client device may include or may execute a variety of possible applications, such as a client software application enabling communication with other devices, such as communicating one or more electronic messages, such as via email, for example Yahoo! ® Mail, short message service (SMS), or multimedia message service (MMS), for example Yahoo! Messenger®, including via a network, such as a social network, including, for example, Tumblr®, Facebook®, LinkedIn®, Twitter®, Flickr®, or Google+®, Instagram™, to provide only a few possible examples. A client device may also include or execute an application to communicate content, such as, for example, textual content, image content, video content, multimedia content, or the like. A client device may also include or execute an application to perform a variety of possible tasks, such as browsing, editing, searching, playing, streaming or displaying various forms of content, including locally stored or uploaded content and and/or messages. The foregoing is provided to illustrate that claimed subject matter is intended to include a wide range of possible features or capabilities.

The principles described herein may be embodied in many different forms. The present disclosure remedies the need in the art for added security of user's personal and private information by providing the disclosed systems and methods that provide additional, novel security features to media files accessible and communicated online. Conventional systems typically employ security protocols to media files as a whole, or at the platform level (e.g., the point of access). The disclosed systems and methods provide improved security features down to the particular content portions (or objects) within a media file.

While the discussion herein will focus on protected and/or secured portions of media files, it should not be construed as limiting, as the disclosed systems and methods can be applied to media files as a whole, and not only to particular portions of such files. Additionally, while the discussion herein will focus on media files having displayable content (e.g., an image file, for example), it should not be construed as limiting, as any type of content comprised within a media file can be subject to the disclosed security implementations discussed herein, such as, but not limited to, whole or portions of, audio, video, text, multimedia, and/or any other known or to be known media and multi-media existing within the digital world.

The disclosed systems and methods, according to some embodiments, involve protecting and/or securing identified (or selected) portions or items of media content within a media file. The protection/security applied to such media file content can occur during the creation of the media file, immediately after such creation, prior to transmittal of the media file (e.g., sending the media file to a user via email or posting on a social media platform), during transmission, after receipt of the media file by a recipient, and/or some combination thereof.

For purposes of this disclosure, the applied protection/security to the media file content will be referred to as "encoding", and the removal and/or unlocking of such security will referred to as "decoding."

According to some embodiments of the instant disclosure, "encoding" (referred to interchangeably as, "obfuscating," "locking," "hiding," and "securing") can involve modifying a selected portion of a media file, whereby the selected portion can be replaced by an encoding key or other form of information that replaces, modifies or otherwise changes the data (e.g., bits) of a media file associated with a selected portion of the media file. In some embodiments, the encoding key can be a public encryption key, a private encryption key (in some embodiments, that is associated with a public key), an identifier, tag, label, a pointer, added content or media item, and/or any other type of data or metadata that can result in identified content being hidden and/or identified as protected. For example, the encoding key can result in the identified portion of a media file being blurred or in-painted with pixels (e.g., via applied scene completion software). In embodiments where the identified content is audio, for example, the encoding key can result in the audio being suppressed (e.g., silenced) when the media file is rendered (e.g., frequencies associated with the audio data can be reduced according to an applied encoding technique, as discussed herein). The encoding key may be defined by a user, the system as a whole, an application, content creator, provider or platform, service provider or platform, and the like, or some combination thereof.

As discussed in more detail below, the encoding key "takes the place" of the selected media file content. In some embodiments, the media file content is extracted and/or removed entirely from the media file, and the encoding key replaces the content within the format, position or structure of the media file. In some embodiments, the encoding key may overlay or "hide" the content so that the media file content is unable to be viewed, read or accessed by a user, device or media platform without having the authenticating key or password for unlocking the encoding (e.g., the decoding key). In some embodiments, encoding results in the selected portion of the media file content being rendered invisible or visibly obfuscated while the encoding key is applied to the selected media file content.

According to some embodiments, replacing, locking and/or hiding the identified/selected content with the encoding key can involve applying encryption to the selected portion of the media file. In some embodiments, the type of encryption architecture, technique, algorithm or scheme applied to the media may be selected and/or defined by the applying user, the system as a whole, an application, a content provider or platform, service provider or platform, and the like, or some combination thereof. According to some embodiments, any known or to be known negotiated encryption key or a pre-defined public and/or private encryption key may be utilized by disclosed systems and methods without departing from the scope of the instant disclosure.

As evidenced from the discussion herein, encoding allows the user and the application, system and/or platform or service to agree on a privacy protocol that is applied to the media file (and media file content). As discussed in more detail below, in some embodiments, the applied privacy protocol may prevent a receiving user's device, a server, application or network platform (or any third party or entity) from performing unauthorized processing, reading, viewing or accessing of the encoded content. In some embodiments, the applied privacy protocol may prevent the encoded content from being identified in a search for the particular content that is encoded.

As discussed in more detail below, when media file content is encoded with an encoding key, information related to the identified content and the applied key can be stored in a database. As discussed in more detail below, the database can comprise a linked dataset where information related to the identified content portion of a media file is stored in association with the applied encoding key. In some embodiments, as mentioned above, the encoding key can comprise a network or resource identifier, or a pointer, where the stored key points to a location in the database of the associated content, and vice-versa. In some embodiments, the database can be constructed as a lookup table (LUT) that effectuates the identification of counterpart information upon receiving a searchable item with the table. As discussed in more detail below, this enables the quick retrieval, and appropriate authentication or denial of users or devices requesting access to the encoded content.

Decoding, as will be discussed in more detail below, results in the encoded content (e.g., protected and hidden or obfuscated content) of the media file being rendered displayable (or renderable) to the user (e.g., to make it visible). In line with the above discussion related to encrypting the media file content upon encoding it, in order to view the encoded content, the disclosed systems and methods can employ any known or to be known decryption techniques or algorithms. As discussed in more detail below, decryption involves entering a defined key, token or command defined during encoding. Upon approval of the entered credentials, the hidden or obfuscated content of the media file may be accessed by retrieving the hidden content from the database based on a search of the database involving a provided key.

By way of a non-limiting example, John has a collection of photographs from a recent vacation that he wants to share publicly on his website, while at the same time wanting to protect his children: only a select group of invited friends are allowed to see their faces, while anyone else is prevented from viewing the portions of the images associated with his children. As discussed in more detail below, for example, the disclosed systems and methods automatically detect the faces of John's kids in his photos and scrambles (e.g., encrypts) their corresponding pixels within the photographs using John's private encryption key. As a result of such applied security, all images can be publicly shared, where anyone can see the non-sensitive areas of the photos, but only trusted members having John's defined-key(s) (e.g., public or private encryption/decryption key(s)) can decrypt (or decode) the areas of the photos containing the kids' faces.

According to some embodiments, the disclosed systems and methods provides a specialized front-end User Interface (UI) for enabling the encoding/decoding security features to be applied to content of media files, as discussed herein, as well as matching server side back-end mechanisms that allow media file content to be secured, as discussed herein.

As discussed in more detail below at least in relation to FIG. 7, according to some embodiments, information associated with, derived from, or input in association with a media file or the content of the media file (e.g., when creating a modified, encoded media file), whether protected or not, as discussed herein, can be used for monetization purposes and targeted advertising when providing, delivering or enabling access to the media file. Providing targeted advertising to users associated with such discovered content can lead to an increased click-through rate (CTR) of such ads and/or an increase in the advertiser's return on investment (ROI) for serving such content provided by third parties (e.g., digital advertisement content provided by an advertiser, where the advertiser can be a third party advertiser, or an entity directly associated with or hosting the systems and methods discussed herein).

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as content server 106, application (or "App") server 108, messaging server 120 and advertising ("ad") server 130.

One embodiment of mobile devices 102-104 is described in more detail below. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, smart watch, tablet computers, phablets, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and an HD display in which both text and graphics may be displayed.

A web-enabled mobile device may include a browser application that is configured to receive and to send web-based messages, and the like. The browser application may be configured to receive and display messages which include graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102-104 also may include at least one client application that is configured to receive content from another computing device. The client application may include a capability to provide and receive textual content, graphical content, audio content, and the like of the message. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier.

In some embodiments, mobile devices 102-104 may also communicate with non-mobile client devices, such as client device 101, or the like. In one embodiment, such communications may include sending and/or receiving messages, searching for, viewing and/or sharing photographs, audio clips, video clips, or any of a variety of other forms of communications. Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 101 may also have differing capabilities for displaying navigable views of information.

Client devices 101-104 computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Network 105 is configured to couple content server 106, application server 108, or the like, with other computing devices, including, client device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another, and/or other computing devices.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, QUIC (Quick UDP Internet Connection), DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, and the like that may route the signal packet in accordance with a target address and availability of a network path to the target address.

According to some embodiments, the present disclosure may also be utilized within or accessible to an electronic social networking site. A social network refers generally to an electronic network of individuals, such as, but not limited to, acquaintances, friends, family, colleagues, or co-workers, that are coupled via a communications network or via a variety of sub-networks. Potentially, additional relationships may subsequently be formed as a result of social interaction via the communications network or sub-networks. In some embodiments, multi-modal communications may occur between members of the social network. Individuals within one or more social networks may interact or communication with other members of a social network via a variety of devices. Multi-modal communication technologies refers to a set of technologies that permit interoperable communication across multiple devices or platforms, such as cell phones, smart phones, tablet computing devices, phablets, personal computers, televisions, set-top boxes, SMS/MMS, email, instant messenger clients, forums, social networking sites, or the like.

In some embodiments, the disclosed networks 110 and/or 105 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

The content server 106 may include a device that includes a configuration to provide content via a network to another device. A content server 106 may, for example, host a site or service, such as a photo-generating and/or hosting site/service (e.g., Tumblr®, Flickr®), a messaging site/service (e.g., Yahoo!® Messenger), an email platform (e.g., Yahoo!® Mail), a social networking site (e.g., Facebook®, Twitter®, SnapChat®), or a personal user site (such as a blog, vlog, online dating site, and the like). A content server 106 may also host a variety of other sites, including, but not limited to business sites, educational sites, dictionary sites, encyclopedia sites, wikis, financial sites, government sites, and the like. Devices that may operate as content server 106 include personal computers desktop computers, multiprocessor systems, microprocessor-based or programmable consumer electronics, network PCs, servers, and the like.

Content server 106 can further provide a variety of services that include, but are not limited to, media capturing services, media hosting services, media generating services, messaging services, search services, email services, web services, social networking services, news services, third-party services, audio services, video services, instant messaging (IM) services, SMS services, MMS services, FTP services, voice over IP (VOIP) services, or the like. Such services, for example a media hosting application and/or platform, can be provided via the application server 108, whereby a user is able to utilize such service upon the user being authenticated, verified or identified by the service. Examples of media file content may include images, text, audio, video, or the like, which may be processed in the form of physical signals, such as electrical signals, for example, or may be stored in memory, as physical states, for example.

An ad server 130 comprises a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user. Such sponsored advertising includes monetization techniques including sponsored search advertising, non-sponsored search advertising, guaranteed and non-guaranteed delivery advertising, ad networks/exchanges, ad targeting, ad serving and ad analytics. Such systems can incorporate near instantaneous auctions of ad placement opportunities during web page creation, (in some cases in less than 500 milliseconds) with higher quality ad placement opportunities resulting in higher revenues per ad. That is advertisers will pay higher advertising rates when they believe their ads are being placed in or along with highly relevant content that is being presented to users. Reductions in the time needed to quantify a high quality ad placement offers ad platforms competitive advantages. Thus higher speeds and more relevant context detection improve these technological fields.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers. For web portals like Yahoo! ®, advertisements may be displayed on web pages or in apps resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, gender, occupation, and the like) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

Servers 106, 108, 120 and 130 may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In some embodiments, users are able to access services provided by servers 106, 108, 120 and/or 130. This may include in a non-limiting example, authentication servers, search servers, email servers, social networking services servers, SMS servers, IM servers, MMS servers, and exchange servers, via the network 105 using their various devices 101-104. In some embodiments, applications such as messaging applications (e.g., Yahoo! ® Mail, Yahoo! Messenger®, Twitter®, Gmail®, and the like), or social network applications (e.g., Twitter®, Instagram®, SnapChat®, Facebook®, and the like) are both configured with the added functionality to secure and unsecure (e.g., hide/unhide or lock/unlock) certain portions of the content. For example, certain posts can be secured in Tumblr® and sent (reblogged) to other users for them to unsecure. Thus, the application server 108 can store various types of applications and application related information including application data and user profile information (e.g., identifying and authenticating information associated with a user). It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein. Embodiments exist where the TSS functionality can be embodied within servers 106, 108, 120 and/or 130.

Moreover, although FIG. 1 illustrates servers 106, 108, 120 and 130 as single computing devices, respectively, the disclosure is not so limited. For example, one or more functions of servers 106, 108, 120 and/or 130 may be distributed across one or more distinct computing devices. Moreover, in one embodiment, servers 106, 108, 120 and/or 130 may be integrated into a single computing device, without departing from the scope of the present disclosure.

Figure 2:
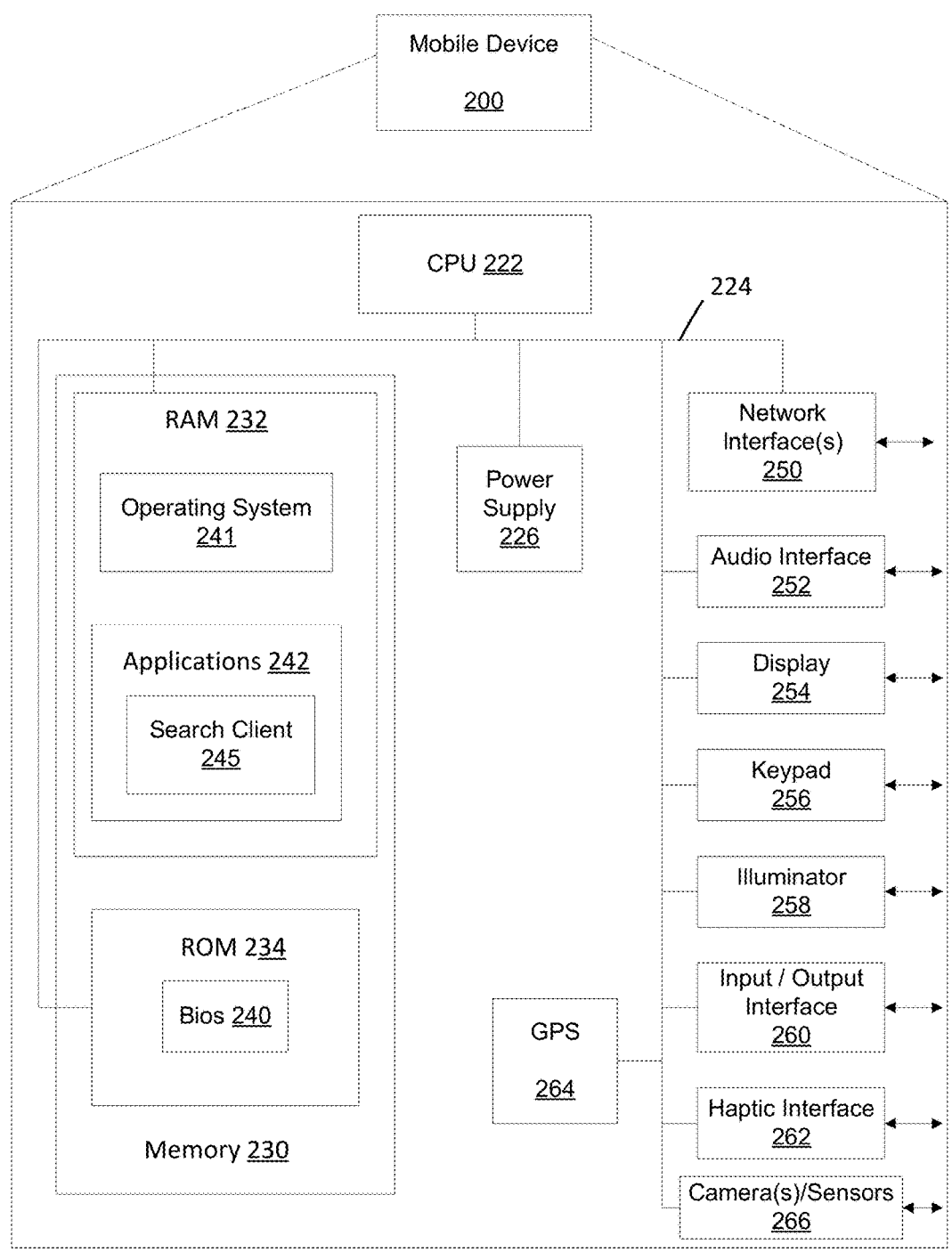
FIG. 2 depicts is a schematic diagram illustrating an example of client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, Client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and a camera(s) or other optical, thermal or electromagnetic sensors 266. Device 200 can include one camera/sensor 266, or a plurality of cameras/sensors 266, as understood by those of skill in the art. The positioning of the camera(s)/sensor(s) 266 on device 200 can change per device 200 model, per device 200 capabilities, and the like, or some combination thereof.

Power supply 226 provides power to Client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling Client device 200 to one or more networks, and is constructed for use with one or more communication protocols and technologies as discussed above. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending messages. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when the Client device 200 receives a communication from another user.

Optional GPS transceiver 264 can determine the physical coordinates of Client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of Client device 200 on the surface of the Earth. It is understood that under different conditions, GPS transceiver 264 can determine a physical location within millimeters for Client device 200; and in other cases, the determined physical location may be less precise, such as within a meter or significantly greater distances. In one embodiment, however, Client device may through other components, provide other information that may be employed to determine a physical location of the device, including for example, a MAC address, Internet Protocol (IP) address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of Client device 200. The mass memory also stores an operating system 241 for controlling the operation of Client device 200. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 230 further includes one or more data stores, which can be utilized by Client device 200 to store, among other things, applications 242 and/or other data. For example, data stores may be employed to store information that describes various capabilities of Client device 200. The information may then be provided to another device based on any of a variety of events, including being sent as part of a header during a communication, sent upon request, or the like. At least a portion of the capability information may also be stored on a disk drive or other storage medium (not shown) within Client device 200.

Applications 242 may include computer executable instructions which, when executed by Client device 200, transmit, receive, and/or otherwise process messages, and enable telecommunication with a server and/or another user of another client device. Other examples of application programs or "apps" in some embodiments include browsers, calendars, contact managers, task managers, transcoders, message management, database programs, word processing programs, security applications, spreadsheet programs, games, search programs, and so forth. Applications 242 may further include search client 245 that is configured to send, to receive, and/or to otherwise process a search query and/or search result using any known or to be known communication protocols. Although a single search client 245 is illustrated it should be clear that multiple search clients may be employed. For example, one search client may be configured to enter a search query message, where another search client manages search results, and yet another search client is configured to manage serving advertisements, IMs, emails, and other types of known messages, or the like.

Having described the components of the general architecture employed within the disclosed systems and methods, the components' general operation with respect to the disclosed systems and methods will now be described below.

Figure 3:
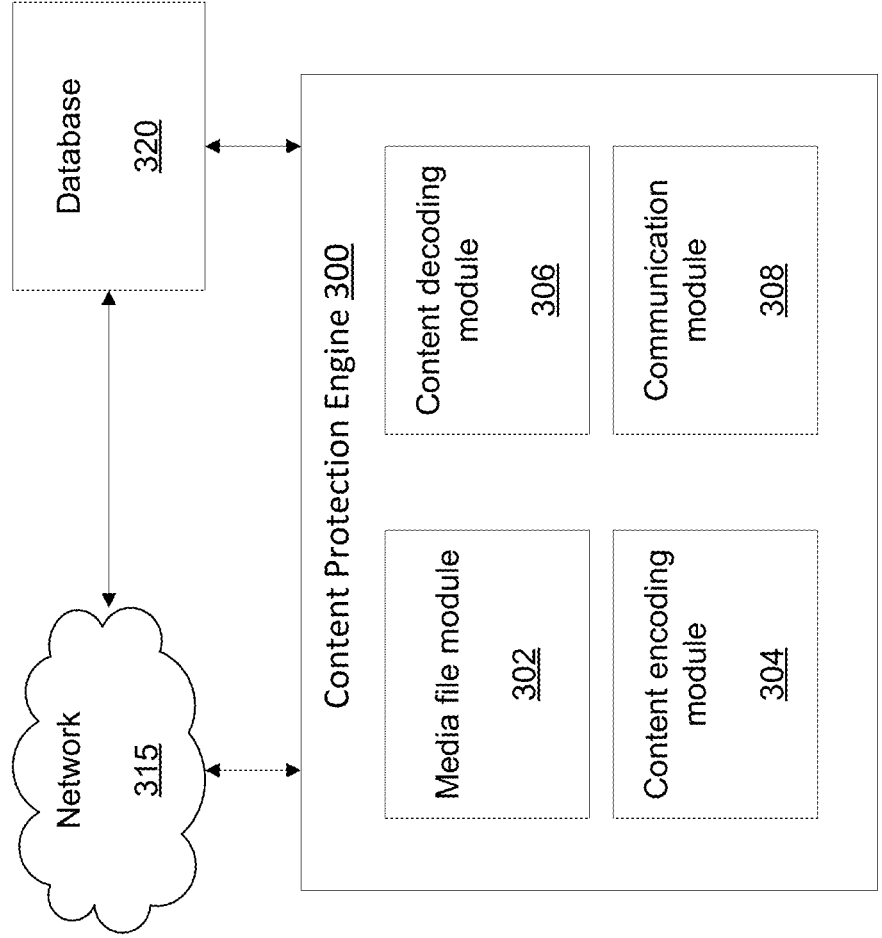
FIG. 3 is a schematic block diagram illustrating components of an exemplary system in accordance with embodiments of the present disclosure.

FIG. 3 is a block diagram illustrating the components for performing the systems and methods discussed herein. FIG. 3 includes a content protection engine 300, network 315 and database 320. The content protection engine 300 can be a special purpose machine or processor and could be hosted by an application server, content server, photo-sharing server, social networking server, web server, search server, content provider, email service provider, ad server, user's computing device, and the like, or any combination thereof.

According to some embodiments, content protection engine 300 can be embodied as a stand-alone application that executes on a user device. In some embodiments, the content protection engine 300 can function as an application installed on the user's device, and in some embodiments, such application can be a web-based application accessed by the user device over a network. In some embodiments, the content protection engine 300 can be installed as an augmenting script, plug-in, extension, program or application to another application (e.g., Flickr®, Tumblr®, Facebook®, Twitter®, SnapChat®, Yahoo!® Mail, and the like).

The database 320 can be any type of database or memory, and can be associated with a content server on a network (e.g., content server 106, messaging server 120 or application server 108 from FIG. 1) or a user's device (e.g., device 101-104 or device 200 from FIGS. 1-2). Database 320 comprises a dataset of data and metadata associated with local and/or network information related to users, services, applications, messages (e.g., comprising media files), content (e.g., media files), and the like. Such information can be stored and indexed in the database 320 independently and/or as a linked or associated dataset. As discussed above, it should be understood that the data (and metadata) in the database 320 can be any type of information and type, whether known or to be known, without departing from the scope of the present disclosure.

According to some embodiments, database 320 can store data for users, i.e., user data. According to some embodiments, the stored user data can include, but is not limited to, information associated with a user's profile, user interests, user behavioral information, user attributes, user preferences or settings, user demographic information, user location information (i.e., past and present location(s) of the user, and future locations of the user (derived from a calendar or schedule of the user—e.g., planned activities), user biographic information, and the like, or some combination thereof. In some embodiments, the user data can also include, for purposes rendering and/or displaying media files, user device information, including, but not limited to, device identifying information, device capability information, voice/data carrier information, Internet Protocol (IP) address, applications installed or capable of being installed or executed on such device, and/or any, or some combination thereof. It should be understood that the data (and metadata) in the database 320 can be any type of information related to a digital media file, an electronic message, a user, content, a device, an application, a service provider, a content provider, whether known or to be known, without departing from the scope of the present disclosure.

According to some embodiments, database 320 can comprise information associated with content providers, such as, but not limited to, photo-sharing applications (e.g., Flickr®), messaging applications (e.g., Yahoo!® Mail, Yahoo! Messenger®, Twitter®, Gmail®, and the like), or social network sites or providers (e.g., Tumblr®, Twitter®, Instagram®, SnapChat®, Facebook®, WhatsApp®, and the like). In some embodiments, database 320 can comprise data and metadata associated with media files from one and/or an assortment of media file hosting, generating and/or communicating sites.

In some embodiments, the information stored in database 320 can be represented as an n-dimensional vector (or feature vector) for each media file, where the information associated with the media corresponds to a node(s) on the vector. Additionally, the media file information in database 320 for each media file can comprise, but is not limited to, text, image, video or multimedia content, a title or comment(s) associated with the media file, tags, descriptions, recency of media file's creation, popularity of the file on a site or sites, transmittal or reception, upload and/or share(s), and the like. Such factors can be derived from information provided by a user, a service provider (e.g., Yahoo! ®, Gmail®), by the content/service providers hosting and/or communicating media content (e.g., Flickr®, Tumblr®, Yahoo!® Messenger, Windows Live Messenger®, and the like), or by other third party services (e.g., Twitter®, Facebook®, Instagram®, and the like), or some combination thereof. In some embodiments, such additional factors can also be translated as nodes on the n-dimensional vector for a respective media file.

As such, database 320 can store and index media file content in database 320 as linked set of media file data and metadata, where the data and metadata relationship can be stored as the n-dimensional vector discussed above. Such storage can be realized through any known or to be known vector or array storage, including but not limited to, a hash tree, queue, stack, VList, or any other type of known or to be known dynamic memory allocation technique or technology. It should be understood by those of skill in the art that the media file information can be analyzed, stored and indexed according to any known or to be known computational analysis technique or algorithm, such as, but not limited to, vector analysis, cluster analysis, data mining, Bayesian network analysis, Hidden Markov models, artificial neural network analysis, logical model and/or tree analysis, and the like.

Database 320 can be a single database or a lookup table (LUT) housing information associated with a media file(s) or provider(s), and in some embodiments, database 320 can be configured as a linked set of data stores that provides such information, as each data store in the set is associated with and/or unique to a specific media file or provider.

As discussed above, with reference to FIG. 1, the network 315 can be any type of network such as, but not limited to, a wireless network, a local area network (LAN), wide area network (WAN), the Internet, or a combination thereof. The network 315 facilitates connectivity of the content protection engine 300, and the database of stored resources 320. Indeed, as illustrated in FIG. 3, the content protection engine 300 and database 320 can be directly connected by any known or to be known method of connecting and/or enabling communication between such devices and resources.

The principal processor, server, or combination of devices that comprises hardware programmed in accordance with the special purpose functions herein is referred to for convenience as content protection engine 300, and includes media file module 302, content encoding module 304, content decoding module 306 and communication module 308. It should be understood that the engine(s) and modules discussed herein are non-exhaustive, as additional or fewer engines and/or modules (or sub-modules) may be applicable to the embodiments of the systems and methods discussed herein. The operations, configurations and functionalities of each module, and their role within embodiments of the present disclosure will be discussed below with reference to FIGS. 4A-6.

Turning to the discussion of the disclosed systems and methods for encoding and decoding media file content, the instant disclosure will first discuss non-limiting example embodiments that can serve as exemplary embodiments of identifying and detecting sensitive content within a media file and obfuscating such content upon rendering the media file.

Figure 4A:
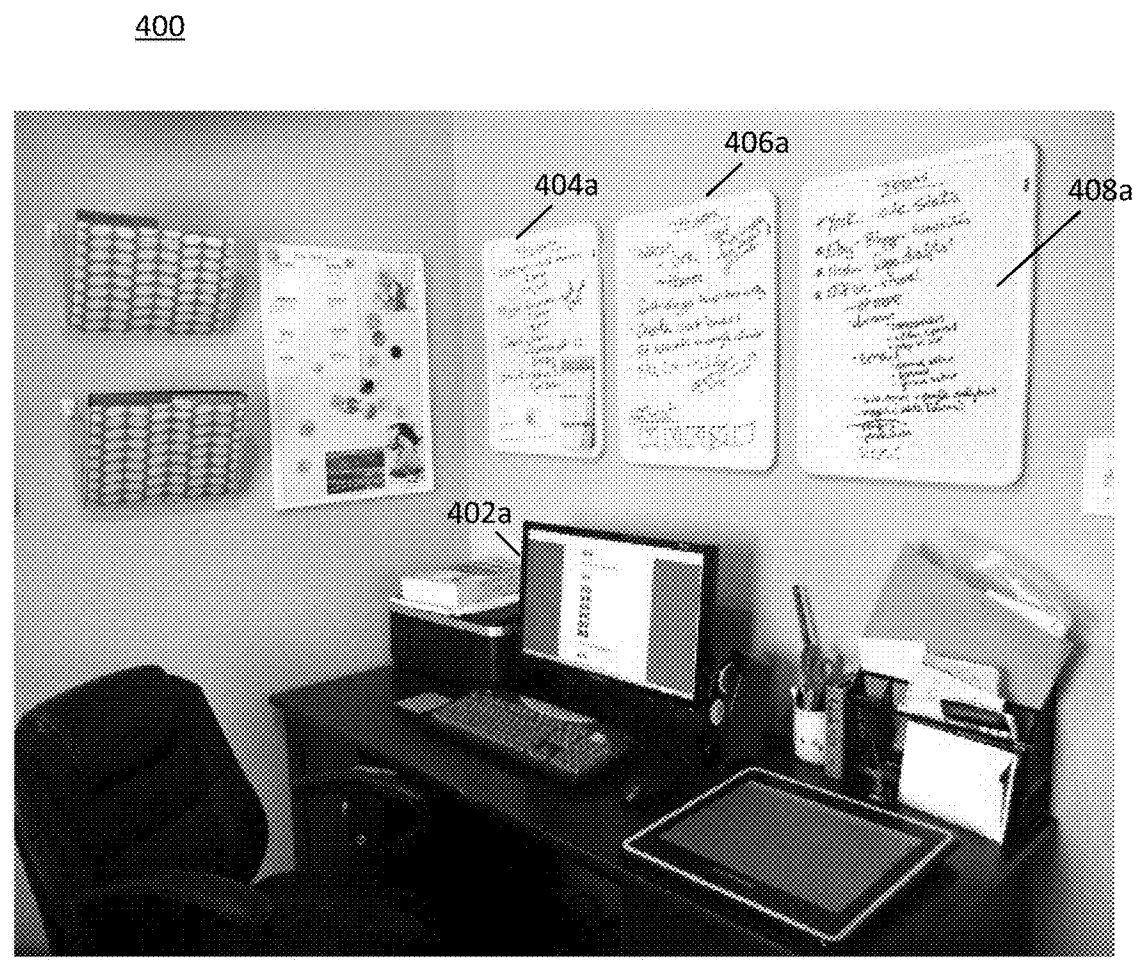
Figure 4B:

FIG. 4A-4C illustrate a non-limiting example embodiment of encoding identified (or selected) portions of media content such that the identified portions are obfuscated from not only view (or rendering) by a user, but also from accessing (e.g., reading, writing and/or any other type of computer performed analysis) by a processing computing device.

By way of a non-limiting example, Company X has a policy that pictures containing digital representations of whiteboards and computer monitors must be obfuscated before they are communicated with the public or non-employees (e.g., image files that contain digital image content representing computer monitors and/or whiteboard material). As illustrated in FIG. 4A, image 400 displays a picture of an employee's workstation, where his computer monitor 402a is displayed, as are whiteboards 404a-408a. As in the example, the content associated with the monitor 402a and whiteboards 404a-408a must be obfuscated (or hidden, or as discussed in more detail below, encoded).

Utilizing the steps discussed below in relation to Processes 500-600, in FIGS. 5-6 respectively, the captured image 400 can be analyzed and modified such that the content associated with items 402a and 404a-408a are obfuscated. As discussed herein, the modified image prevents a user from viewing the original content associated with items 402a and 404a-408a, as well as a computer being able to analyzed and render the original content associated with such items.

For example, as illustrated in FIG. 4B, the encoding process of 500 discussed below results in the content associated with items 402a and 404a-408a in original image 400 being modified such that modified image 410 is the result— an encoded version of image 400. Modified image 410 includes modified image portions 402b and 404b-408b, while the remaining portions of the image remain intact and unchanged. Item 402b depicts an encoded version of the content of item 402a, and items 404b-408b depict encoded versions of the content of items 404a-408a, respectively.

As discussed above, modifying (or encoding) an identified image portion can involve replacing the identified portions with information associated with an applied encoding key. In some embodiments, such information can involve replacing the original content with an identifier, tag, label or other form/type of content. As in the example between FIGS. 4A and 4B, the content of items 402a and 404a-408a have been replaced with "blank" image content. That is, modified/encoded image 410 now has the monitor 402b depicting a blank computer screen (e.g., .jpeg content of a standard home screen of a computer desktop), and whiteboards 404b-408b depicting blank white boards (e.g., white .jpeg content, for example). In some embodiments, the applied content (referred to as "placeholder content") can selected to be the same format as the original image (e.g., the image 400 was in .jpeg format; therefore, the placeholder content applied to identified portions of image 400 resulting in the modified image 410 (via encoding) are also in .jpeg format).

In another non-limiting example, as illustrated in FIG. 4C, the encoding process of 500 discussed below results in the content associated with items 402a and 404a-408a in original image 400 being modified such that modified image 420 is the result—an encoded version of image 400. Modified image 420 includes modified image portions 402c and 404c-408c. Item 402c depicts an encoded version of the content of item 402a, and items 404c-408c depict encoded versions of the content of items 404a-408a, respectively. For example, as illustrated in FIG. 4C, image 420 is a modified/encoded image version of image 400, where items 402c and 404c-408c depict blurred pixels, thereby hiding the previously viewable content from view from a user and computer upon rendering. In some embodiments, such blurred pixels can be a result of applied placeholder content, as discussed above.

As discussed in more detail below, the encoding of the image 400 to modified versions 410 and 420 results in the selected content portions being obfuscated by removing, overwriting, replacing or otherwise modifying the bit sequence(s) of the original image file that correspond to the selected content (e.g., the pixels in the photo) with bits associated with an applied encryption key, thereby partially scrambling the rendering of content of the original image 400.

According to some embodiments, as discussed in more detail below, the obfuscation of selected image content can be a result of a user identifying specific content. In some embodiments, in combination and/or the alternative, the obfuscation of selected image content can be the result of an automatically detected and applied rule-set, where the rule-set dictates that when a media file is determined to contain certain types of content (from the data/metadata associated with the media file) and instructs a computing device to perform the disclosed encoding.

For example, in accordance with the examples depicted in FIGS. 4A-4C, a user capturing the image may know of Company X's policy; therefore, after capturing the image, and prior to upload to his/her Flickr® account, the user can apply the encoding processes discussed herein. In another non-limiting example, in accordance with the examples depicted in FIGS. 4A-4C, upon the image being uploaded to the user's Flickr® page, Flickr® can automatically implement the content protection engine 300 in order to automatically identify content objects within the image media file that satisfy Company X's policy. For example, since the image media file contains geographic data indicating that the image was taken at Company X's office physical location, engine 300 can automatically analyze the image content within the media file (e.g., image 400) and apply the encoding process discussed above and outlined below in reference to Process 500 in order to encode the content associated with the monitor and whiteboards.

Turning to FIG. 5, Process 500 details steps performed in accordance with some embodiments where a created media file has particular portions of the content encoded (or obfuscated) so that an unauthenticated user or computing device cannot render such portions of content. Step 502 of Process 500 is performed by the media file module 302 of the content protection engine 300, Steps 504-508 are performed by the content encoding module 304, and Steps 510-512 are performed by the communication module 308.

Process 500 begins with Step 502 where a media file is identified. Step 502 can involve any form or type of known or to be known media file identification or creation process. For example, Step 502 can involve searching a database of images (e.g. user generated content (UGC)) or a web-search of images, and identifying an image from such collection. In another example, Step 502 can involve a user capturing an image on his/her mobile device.

For purposes of simplicity in discussing the disclosed systems and methods, the media file discussed in reference to Process 500 (and 600) will be an image file; however, it should not be construed as limiting, as one of skill in the art would understand that any type of media file, whether known or to be known, can be identified, analyzed and modified according to the disclosed systems and methods, without departing from the scope of the instant disclosure. Indeed, the identified and encoded/decoded media file portions, as discussed herein, are not limited to only image content, as any type of content can be obfuscated from a media file without departing from the instant disclosure's scope—for example, audio, video, text, or any other type of multi-media, whether known or to be known.

In Step 504, an encoding input is received that identifies a portion of the media file. The received encoding input includes identification of a particular portion (or portions) of the identified media file. Such portions are those portions of content that are determined to be "sensitive" for communication over a network—e.g., content that provides information personal to a user, service, company and the like that is desired to be protected from public dissemination. For example, such information can include, but is not limited to, faces, voices, computer monitors, whiteboards, logos, street signs, blueprints, landmarks, and the like.

In some embodiments, Step 504's encoding input includes information identifying not only a specific portion(s) of a media file, but also those other users that are designated (or permitted) to ultimately view the content (e.g., those users allowed to decode, or unlock, the encoded content), as discussed in more detail below.

As discussed above in relation to FIGS. 4A-4C, in some embodiments, identification of the media file portion can be resultant of a user specifically identifying such portion (e.g., via any known or to be known type of user input or entered command), and in some embodiments, such identification can involve a computing device (e.g., a device used to capture the image, upload the image, copy the image or download the image) automatically analyzing the image in order to identify such portions. In some embodiments, automatic analysis of an image to identify whether portions should be protected can be based on any type of information associated with the identifying step of the media file—for example, the time, location, user's identity, a rule or policy, and the like, or some combination thereof, associated with the capture, upload, search, hosting, communication and/or download of an image.

According to some embodiments, where the encoding input is automatically provided as a result of a computing device automatically analyzing the identified image from Step 502, the identification of the portion of the media file (from Step 504) can be based on image recognition software implemented by the content encoding module 304. Such software can be defined by any known or to be known computational analysis technique or algorithm, such as, but not limited to, cluster analysis, data mining, Bayesian network analysis, Hidden Markov models, deep learning analysis, image recognition analysis, voice recognition analysis, logical model and/or tree analysis, and the like. In some embodiments, such deep learning architecture or algorithm, such as, but not limited to, deep neural networks, artificial neural networks (ANNs), convolutional neural networks (CNNs), deep belief networks and the like.

According to some embodiments, the content encoding module 304 can employ CNNs (however, it should not be construed to limit the present disclosure to only the usage of CNNs, as any known or to be known deep learning architecture or algorithm is applicable to the disclosed systems and methods discussed herein). CNNs consist of multiple layers which can include: the convolutional layer, ReLU (rectified linear unit) layer, pooling layer, dropout layer and loss layer, as understood by those of skill in the art. When used for image recognition, CNNs produce multiple tiers of deep feature collections by analyzing small portions of an input image.

For purposes of this disclosure, such features/descriptors can include, but are not limited to, visual characteristics of the images characterized (or categorized and labeled) by color features, texture features, type features, edge features and/or shape features, and the like. The results of these collections are then tiled so that they overlap to obtain a better representation of the original image; which is repeated for every CNN layer. CNNs may include local or global pooling layers, which combine the outputs of feature clusters. One advantage of CNNs is the use of shared weight in convolutional layers; that is, the same filter (weights) is used for each pixel in each layer, thereby reducing required memory size and improving performance. Compared to other image classification algorithms, CNNs use relatively little pre-processing which avoids the dependence on prior-knowledge and the existence of difficult to design hand-crafted features.

It should be understood by those of skill in the art that the features/attributes (or descriptors or deep descriptors) of the media file can include any type of information contained in, or associated therewith, including image data, video data, audio data, multimedia data, metadata, or any other known or to be known content that can be associated with, derived from or comprised within the identified media file.

Thus, according to some embodiments, Step 504's identifying of a portion of a media file via image recognition software, using CNN for image classification, involves the content encoding module 304 performing a series of transformations to an image in order to return information associated with bits or data of particular portions of a media file as an output. Such transformations can include, but are not limited to, numerical transformations of a 2D convolution for an image, 3D convolution for a sequence of bits (or set sequence of bits), average/max pooling over local regions in space and time, local response normalization, and the like. As discussed above, implementation of a CNN image classification embodiment involves multiple layers that represent an input at an increasing level of abstraction in a fine-to-coarse manner. For example, a low-level layer can represent an input image (associated with a set of bits) as activations to several 3×3 edge filters, while a high-level filter may represent the input image as activations to several 32×32 object-like shape filters. The CNN classification can then include a last layer that produces the information identifying the bits or data of particular portions of a media file that are to be encoded. Such layer can include any type of classification technique or algorithm, such as, for example, a softmax function, which, in some embodiments, can be followed by an argmax operation.

In some embodiments, the image recognition software implemented by the content encoding module 304 can be defined by any type of known or to be known facial recognition, object recognition or voice recognition algorithm or technique that can identify requested portions of content within a media file—such as, but not limited to, geometric algorithms, photometric algorithms, three-dimensional (3D) algorithms and/or skin-texture algorithms. For example, such algorithms can include, but are not limited to, principal component analysis using Eigen-faces, linear discriminate analysis, elastic bunch graph matching using the Fisherface algorithm, a Hidden Markov model, the Multilinear Subspace Learning using tensor representation, a neuronal motivated dynamic link matching, and the like.

Therefore, as a result of the analysis performed in Step 504, as detailed above, a portion of the media file (e.g., that is identified by a user or complies with a determined rule set, which can be provided and/or identified as part of the encoding input in Step 504) is identified, as discussed above. For example, a portion of a media file can be the region of the image associated with a person's face.

In some embodiments, the identified media file (from Step 502) may be subject to particular digital media rights (DRM) or other forms of access rights (e.g., parental controls, or age-restricted content). Therefore, some embodiments, Step 504 can involve identifying a user associated with the media file (e.g., the user requesting access to the media file, uploading the media file, identified as a recipient of the media file, and the like) and determining whether such user has permissions to encode (or decode) the media file (e.g., permissions provided by the rights owner of the media file, a trusted platform hosting the media file, or a predetermined rule-set restricting access to a particular class of individuals). Such identification can involve extracting, detecting, or otherwise identifying user identifying information from the encoding input provided by a user, or provided in association with a user that has identified the media file from Step 502, and determining whether satisfactory rights have been established.

In Step 506, an encoding key is determined based on the received encoding input, where the encoding key is to be used for encoding the identified portion of the media file, as discussed below.

According to some embodiments, the encoding key used for encoding the media file can be provided as part of the encoding input. In some embodiments, the encoding key can be provided and/or generated by a user, and in accordance with the encoding input, as discussed above, the user can identify a set of users that are to be provided the key—so that the users in the set can decode the encoded portions of the media file, as discussed in more detail below. In some embodiments, Step 506 can involve parsing the encoding input and identifying such key. According to some embodiments, the encoding key can be automatically determined, generated, or otherwise identified based on the encoding input via the content encoding module 304. In some embodiments, the encoding key can be a single key or token, or a plurality of keys or tokens.

In some embodiments, the encoding key can take the form of a public encryption key or a private encryption key. In the embodiments where the encoding key is a public key, Step 506 can further involve creating a private key (referred to as a "decoding key") to share with the identified users that are permitted to view the encoded content of the media file (e.g., use the private key to decode the encoded content, as discussed in more detail below in relation to FIG. 6).

In Step 508, the content encoding module 304 automatically encodes the media file via content encrypting software in order to encode the identified portions of the media file. Such encoding can be performed by any known or to be known encryption architecture, technique or algorithm utilizing the encoding key in order to modify the bit sequence of the media file associated with the identified portion such that the content of the media file associated with such portion is obfuscated.

According to some embodiments, modification of the media file involves encoding the bits of the media file with the same size/length as the sequence of bits of the underlying content representation associated with the identified portion. This allows each bit in the original sequence to be replaced by its corresponding bit in the encoded sequence. Many media formats allow external data to be embedded within the media object itself (e.g., JPEG), which can be used for storing information related to the encoding (e.g. the top-left pixel and the bottom-right pixel that delineate the rectangular image area that was encoded). For other media formats that do not support embedding, the encoding of Step 508 can involve creating an accompanying file (of data and metadata) containing the information related to the encoding. Therefore, Step 508 can further involve a determination as to which type of file format the identified media file is, then performing the encoding by modifying the file to apply the encoding scheme, or creating an associated file, as discussed above.

According to some embodiments, the encoding schemes applied by the content encoding module 304 can result in shorter and/or longer bit sequences to be produced as a result of encoding. In this situation, the original bit sequence is not directly replaced by the encoded bit sequence; here, the content encoding module 304 erases or suppresses the original content (or replaces it by random values, or by a placeholder content, for example) so it is no longer intelligible and, in addition to the aforementioned encoding-related information, an encoded bit sequence is created as an accompanying or embedded file.

According to some embodiments, the encoding occurring in Step 508 can involve providing the media file to a third party (e.g., an entity that has DRMs for modifying and/or disseminating a media file). The third party can then provide the encoding input (e.g., identify the users that are permitted to view the decoded content, and the encoding/decoding key) and perform the encoding, as discussed above. Upon such processing, the encoded media file, and associated information (either as an associated file or embedded in the media file) can be provided to the device performing Process 500. In some embodiments, as discussed below, the information associated with and resultant from the encoding, when performed by a third party, can be stored in a database (e.g., database 320), and network location information associated with such storage can be returned to the device (e.g., a pointer or uniform resource locator (URL).

As discussed in more detail below, in some embodiments, only the decoding key may be provided as a response to the encoding, such that the users receiving the encoded media file that are identified as being permitted to decode the encoded version of the media file receive the decoding key. In such embodiments, the decoding can be performed the third party, as discussed in more detail below, and the encoded bits associated with obfuscated content portions of the media file can be communicated to the decoding user.

In Step 510, the information triggering, associated with and resultant from the encoding of Step 508 is stored in a database. As discussed above, such storage involves storing the modifications to the original file performed during the encoding (e.g., information related to which content has been modified and/or which locations within the media file have been modified/obfuscated) and the encoding key in association with one-another within a look-up table (LUT). In some embodiments, a created decoding key, as discussed above, can also be stored within the LUT accordingly. In some embodiments, identifiers associated with users permitted to decode the encoded content can also be stored within the LUT accordingly (which includes users identified from the encoding input, as well as the encoding user). Such storage of the encoding information (e.g., information related to modified bits, encoding/decoding keys and allocated users granted permission to a decoding key) enables later retrieval of information enabling encoded content to be decoded (or unlocked) so that obfuscated content can later be viewed by permitted users/devices.

In Step 512, the encoded media file (e.g., the version of the media file that has been encoded such that the bits/data of the portions of the media file have been modified to hide the content associated with such portions when the media file is rendered) is communicated over an electronic network. As discussed above, such communication can involve creating an electronic message over any type of known or to be known communication platform, and sending such message with the encoded media file included therein. For example, the encoded media file can be emailed to another user, can be sent as an MMS message to another user, can be shared over social network with other users tagged with the image, can be posted to a user's social media page, can be posted to a user's photo-sharing site, and the like.

Turning to FIG. 6, Process 600 details steps performed in accordance with some embodiments where an encoded media file is received and rendered, and a decoding process is performed in order to unlock (or decode) the hidden content. Steps 602 and 614 are performed by the media file module 302 of the content protection engine 300, and Steps 604-612 are performed by the content decoding module 306.

By way of a non-limiting example, using FIGS. 4A-4B as an example, after a user is presented the modified image 410 in FIG. 4B, upon proper decoding of the media file 410, the content associated with items 402*b* and 404*b*-408*b* that was obfuscated is decoded so that the display of such content resembles the display associated with items 402*a* and 404*a*-408*a*. Thus, the original, unencoded image is displayed—image 400—as a result of the decoding of the encoded image 410.

Process 600 begins with Step 602 where the encoded media file communicated in Step 512 is rendered to a user. For example, user Jim notices that user Bob has posted the encoded media file on his Flickr® page. Jim double clicks on the thumbnail of the media file and opens image on his device. As illustrated in FIGS. 4B and 4C, the rendered encoded image is displayed so that the encoded content is obfuscated while the unencoded content is unchanged.

In Step 604, a decoding input is received from the user to decode the encoded media file. According to some embodiments, decoding input comprises a request (or information indicating the recipient's desire) to decode the hidden media file content. In some embodiments, the decoding request includes a decoding key, information associated with a decoding key (e.g., an identifier of a decoding key or resource location of a decoding key), and an identifier associated with the requesting user, or some combination thereof.

In some embodiments, the decoding input can be provided by a user in relation to the encoded content of the displayed media file (e.g., an input provided by the user respective to the portion of the displayed media file that is encoded). In some embodiments, the decoding input can be a similar input type related to the encoding input, as discussed above. In some embodiments, the decoding input can be automatically generated upon the user rendering the media file in Step 602, or receiving it from Step 514.

In Step 606, a determination is made by the content decoding module 306 as to whether the decoding input includes satisfactory information for decoding the media file. In some embodiments, Step 606 involves determining whether the decoding key or decoding key information provided in the decoding input corresponds to the encoding key that encoded the media file—e.g., does the decoding key match the encoding key, or is it otherwise associated with the encoding key (thereby granting access—e.g., public-private keys)) in order to unlock the content hidden by application of the encoding key. In some embodiments, Step 606 involves searching the LUT based on the identifier of the user in order to determine whether the appropriate key (the decoding and/or encoding key) has been stored in manner that indicates the user is permitted to unlock the obfuscated content.

In Step 608, upon a determination that the requesting user is permitted to view the content that is currently being obfuscated, the content decoding module 306 automatically decodes the media file using the decoding key (that was provided in the decoding input or identified based on the identifier of the user, as discussed above). Such decoding can be performed using any known or to be known decryption architecture, technique or algorithm that unlocks protected content using a key or token.

According to some embodiments, the decoding occurring in Step 608 involves the bit sequences associated with the encoded portions of the encoded media file being sent to the device of the requesting user such that the decoded bit sequences (e.g., original bit sequences that were modified or replaced during encoding) replace (or overwrite) the encoding bit sequences. In some embodiments, the entire original media file (e.g., decoded media file) is sent to the requesting user.

In some embodiments, the Step 606-608 can be performed on the requesting user's device; in some embodiments, Steps 606-608 can be performed on a server device (of a hosting platform or service, or associated with a third party, as discussed above); and in some embodiments, Steps 606-608 can be performed by distributed devices—a user's device and server device, each performing either or both steps in combination with the other device.

In Step 610, the decoded version of the media file is rendered. By way of another example, if the encoded version of the media file that was rendered is image 420 from FIG. 4C, then the decoded version is image 400 from FIG. 4A.

Turning back to Step 606, when the determination results in the decoding key or user identifier not enabling the user to decode the encoded media file (e.g., the decoding key is incorrect or has expired, or the identifier of the user is not found in the LUT), then in Step 612 the decoding input is declined. In some embodiments, this can involve a dialog box, command window or prompt, a sound effect (or any other type of output) being displayed/rendered to the user providing an indication of the declined decoding request. Thus, as a result of Step 612, in Step 614, the device maintains the rendering of the encoded version of the media file. In some embodiments, the user can provide another decoding input (as in Step 604); however, embodiments exist where only a predetermined number of decoding inputs can be requested before any decoding input request is automatically declined or prevented from even being requested. In some embodiments, submission of a threshold satisfying number of declined decoding requests can result in the encoding image being restricted from view or rendering by the requesting user/device.

Figure 7:
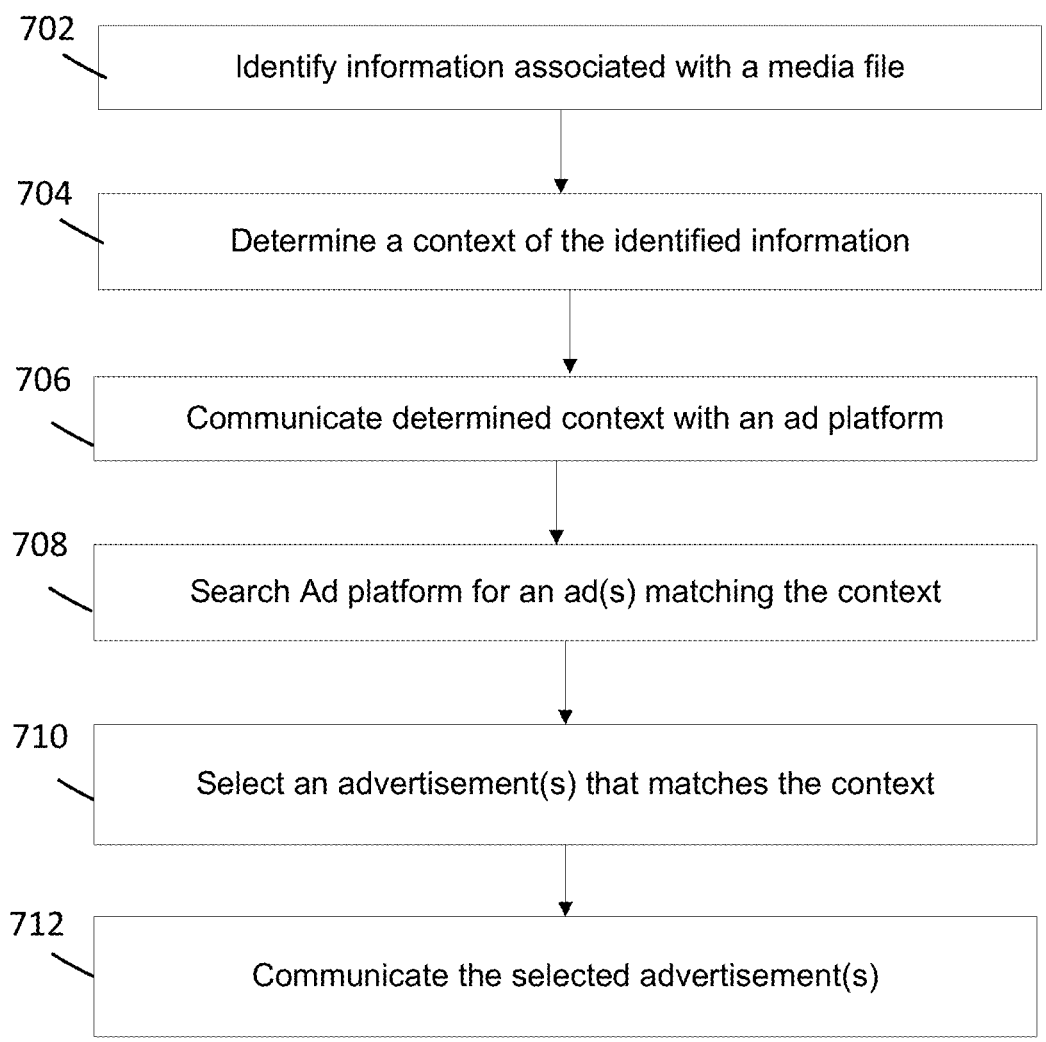
FIG. 7 is a flowchart illustrating steps performed in accordance with some embodiments of the present disclosure.

FIG. 7 is a work flow example 700 for serving relevant digital content associated with advertisements (e.g., advertisement content) based on the information associated with communicated messages, as discussed above. Such information, referred to as "media file information" for reference purposes only, can include, but is not limited to, the content in a media file (whether protected or unprotected), identity of the sending or receiving user of the media file or creator of the media file, the identity and/or type of the application being used to communicate and/or modify such media files, and the like, and/or some combination thereof.

As discussed herein, reference to an "advertisement" should be understood to include, but not be limited to, digital content that provides information provided by another user, service, third party, entity, and the like. Such digital ad content can include any type of media renderable by a computing device, including, but not limited to, video, text, audio, images, and/or any other type of known or to be known multi-media. In some embodiments, the digital ad content can be formatted as hyperlinked multi-media content that provides deep-linking features and/or capabilities.

By way of a non-limiting example, work flow 700 includes user John taking a picture of his friend Bill. John knows that Bill does not want his likeness broadcast over social media. Therefore, when John posts the picture to his Tumblr® page, John performs the obfuscating process outlined in Process 500 discussed above so that the portion of the picture (e.g., image file) associated with the digital representation of Bill's face is obfuscated (or hidden). John has secured the image; however, the picture can be analyzed to determine that the message's context is relation to other types of information in the picture—for example, that the picture was taken at Niagara Falls the previous day. Therefore, John (or Bill, or any user viewing the image) can receive promotional information in the form of digital advertisements displayed on his device or sent to his inbox related to tours or other events occurring at Niagara Falls (since the context of the picture indicates that John is at Niagara Falls, especially since the picture was taken yesterday). In some embodiments, once the hidden content is revealed (e.g., unlocked), digital ads may be sent to John related to the unlocked content. For example, if the hidden portion related to the digital representation of Bill includes Bill wearing a baseball jersey, ads related to baseball products or promotions can be displayed in association with the picture, as discussed below.

In Step 702, media file information associated with a communicated message is identified. For purposes of this disclosure, Process 700 will refer to single media file as the basis for serving an advertisement(s); however, it should not be construed as limiting, as any number of media files can form the basis for serving ads without departing from the scope of the instant disclosure.

In Step 704, a context is determined based on the identified media file information. This context forms a basis for serving advertisements related to the media file information. In some embodiments, the context can be determined by determining a category which the media file information of Step 702 represents. For example, the category can be related to the content type of the content in the media file. In some embodiments, the identification of the context from Step 704 can occur before, during and/or after the media file is modified and/or communicated, or some combination thereof.

In Step 706, the context (e.g., content/context data) is communicated (or shared) with an advertisement platform comprising an advertisement server 130 and ad database. Upon receipt of the context, the advertisement server 130 performs a search for a relevant advertisement within the associated ad database. The search for an advertisement is based at least on the identified context.

In Step 708, the advertisement server 130 searches the ad database for an advertisement(s) that matches the identified context. In Step 710, an advertisement is selected (or retrieved) based on the results of Step 708. In some embodiments, the selected advertisement can be modified to conform to attributes of the page, file, message, application or method upon which the advertisement will be displayed, and/or to the application and/or device for which it will be displayed. In some embodiments, the selected advertisement is shared or communicated via the application the user is utilizing to communicate or render the media file (e.g., Yahoo! Mail®, Tumblr®, Flickr®, Facebook®, Twitter®, SnapChat®, and the like). Step 712. In some embodiments, the selected advertisement is sent directly to each user's computing device. In some embodiments, the selected advertisement is displayed in conjunction with the communicated media file(s) and/or protected content.

Figure 8:
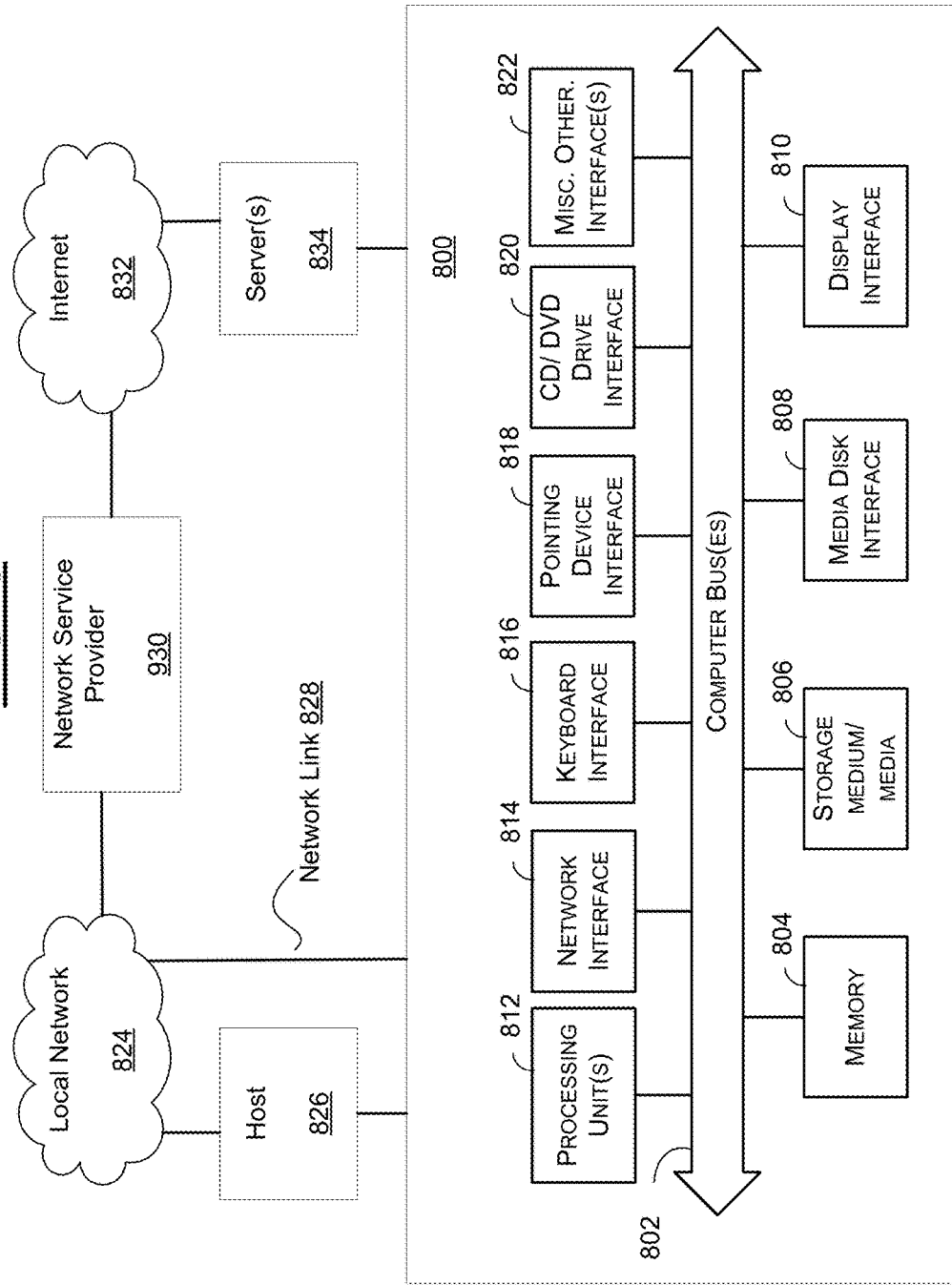
FIG. 8 is a block diagram illustrating the architecture of an exemplary hardware device in accordance with one or more embodiments of the present disclosure.

As shown in FIG. 8, internal architecture 800 of a computing device(s), computing system, computing platform, and the like includes one or more processing units, processors, or processing cores, (also referred to herein as CPUs) 812, which interface with at least one computer bus 802. Also interfacing with computer bus 802 are computer-readable medium, or media, 806, network interface 814, memory 804, e.g., random access memory (RAM), run-time transient memory, read only memory (ROM), media disk interface 808 and/or media disk drive interface 820 as an interface for a drive that can read and/or write to media including removable media such as floppy, CD-ROM, DVD, media, display interface 810 as interface for a monitor or other display device, keyboard interface 816 as interface for a keyboard, pointing device interface 818 as an interface for a mouse or other pointing device, and miscellaneous other interfaces 822 not shown individually, such as parallel and serial port interfaces and a universal serial bus (USB) interface.

Memory 804 interfaces with computer bus 802 so as to provide information stored in memory 804 to CPU 812 during execution of software programs such as an operating system, application programs, device drivers, and software modules that comprise program code, and/or computer executable process steps, incorporating functionality described herein, e.g., one or more of process flows described herein. CPU 812 first loads computer executable process steps from storage, e.g., memory 804, computer readable storage medium/media 806, removable media drive, and/or other storage device. CPU 812 can then execute the stored process steps in order to execute the loaded computer-executable process steps. Stored data, e.g., data stored by a storage device, can be accessed by CPU 812 during the execution of computer-executable process steps.

Persistent storage, e.g., medium/media 806, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 828 typically provides information communication using transmission media through one or more networks to other devices that use or process the information. For example, network link 828 may provide a connection through local network 824 to a host computer 826 or to equipment operated by a Network or Internet Service Provider (ISP) 830. ISP equipment in turn provides data communication services through the public, worldwide packet-switching communication network of networks now commonly referred to as the Internet 832.

A computer called a server host 834 connected to the Internet 832 hosts a process that provides a service in response to information received over the Internet 832. For example, server host 834 hosts a process that provides information representing message data for presentation at display 810. It is contemplated that the components of system 800 can be deployed in various configurations within other computer systems, e.g., host and server.

At least some embodiments of the present disclosure are related to the use of computer system 800 for implementing some or all of the techniques described herein. According to one embodiment, those techniques are performed by computer system 800 in response to processing unit 812 executing one or more sequences of one or more processor instructions contained in memory 804. Such instructions, also called computer instructions, software and program code, may be read into memory 804 from another computer-readable medium 806 such as storage device or network link. Execution of the sequences of instructions contained in memory 804 causes processing unit 812 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 800. Computer system 800 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 802 as it is received, or may be stored in memory 804 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives messages provided by the message or service provider over the Internet in a browser session, or can refer to an automated software application which receives the messages and stores or processes the messages.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
    identifying, via a computing device, a media file comprising digital media content;
    receiving, at the computing device, an input associated with said media file, said input comprising information identifying a portion of the digital media content of the media file;
    automatically encoding, via the computing device in response to said input, said media file, said encoding comprising the computing device applying an encoding key via software defined by an encryption algorithm to the identified portion of the media file, said application of the encoding key via software defined by the encryption algorithm causing the media file to be modified such that only the identified portion of digital media content is obfuscated; and
    communicating, via the computing device over a network, said encoded media file to a user, said communication causing a display of the encoded media file in a modified manner, said display comprises display of the media file content such that the modified media file content is displayed in a visibly obfuscated manner, and unencoded portions of the media file are not visibly obfuscated.

2. The method of claim 1, further comprising:
    storing information associated with the identified portion, a set of users designated with permissions to view said portion and the encoding key in a look-up-table in a database.

3. The method of claim 2, further comprising:
    receiving, from the user, a request to decode the encoded media file content, said decoding request comprising information to be used to authenticate said user; and
    determining, based on said decoding request, whether to authenticate said user, said determination comprising:
        upon a determination that said user is authenticated:
            automatically decoding the media file based on said decoding request; and
            communicating unencoded content associated with the identified portion to said user;
        upon a determination that said user is not authenticated, declining said decoding request.

4. The method of claim 3, wherein, upon said authentication of the user, said information in said decoding request is determined to comprise at least a portion of the stored information.

5. The method of claim 3, wherein said encoding key is a public key associated with said encryption software, wherein said method further comprises generating a private key in response to using said public encoding key, wherein said private key is used as a decoding key to automatically decode the media file.

6. The method of claim 1, wherein said communication further comprises providing information associated with the encoding key to said user when said user is identified as part of a set of users designated with permissions to view said portion.

7. The method of claim 1, wherein said encoding further comprises:
    parsing said media file to identify bits of the media file that correspond to said identified portion; and applying said encryption software to said identified bits, said application comprising modifying said bits based on said encoding key, said modification resulting in said obfuscation.

8. The method of claim 1, wherein said encoding further comprises:
embedding content associated with the encoding key in the media file in association with a location of the identified portion, wherein said display of the encoded media file content comprises displaying said embedded content.

9. The method of claim 1, wherein said identified portion of the digital media content corresponds to at least one content object depicted within the digital media content.

10. The method of claim 1, further comprising:
displaying said media file on a display of said computing device; and
receiving, from a user, input identifying a displayed portion of the displayed media file, said displayed portion associated with said identified portion of the digital media content.

11. The method of claim 1, further comprising:
automatically analyzing, in response to identifying said media file, the media file, said analysis comprising the computing device applying software defined by an image recognition algorithm;
identifying, based on said analysis, said portion of the digital media content via said image recognition software.

12. The method of claim 11, wherein said analysis is based on a preset rule, wherein said preset rule identifies a type of content, wherein said identified portion is determined to correspond to said type of content during said identification.

13. The method of claim 1, further comprising:
determining a context of the encoded media file;
causing communication, over the network, of said context to an advertisement platform to obtain digital advertisement content associated with said context; and
communicating a digital content object comprising said identified digital advertisement content with said encoded media file to the user.

14. A non-transitory computer-readable storage medium tangibly encoded with computer-executable instruction, that when executed by a computing device, perform a method comprising:
identifying a media file comprising digital media content;
receiving an input associated with said media file, said input comprising information identifying a portion of the digital media content of the media file;
automatically encoding, in response to said input, said media file, said encoding comprising the computing device applying an encoding key via software defined by an encryption algorithm to the identified portion of the media file, said application of the encoding key via software defined by the encryption algorithm causing the media file to be modified such that only the identified portion of digital media content is obfuscated; and
communicating, over a network, said encoded media file to a user, said communication causing a display of the encoded media file in a modified manner, said display comprises display of the media file content such that the modified media file content is displayed in a visibly obfuscated manner, and unencoded portions of the media file are not visibly obfuscated.

15. The non-transitory computer-readable storage medium of claim 14, further comprising:
storing information associated with the identified portion, a set of users designated with permissions to view said portion and the encoding key in a look-up-table in a database;
receiving, from the user, a request to decode the encoded media file content, said decoding request comprising information to be used to authenticate said user; and
determining, based on said decoding request, whether to authenticate said user, said determination comprising:
upon a determination that said user is authenticated:
automatically decoding the media file based on said decoding request; and
communicating unencoded content associated with the identified portion to said user;
upon a determination that said user is not authenticated, declining said decoding request.

16. The non-transitory computer-readable storage medium of claim 15, wherein, upon said authentication of the user, said information in said decoding request is determined to comprise at least a portion of the stored information, wherein said encoding key is a public key associated with said encryption software, wherein said method further comprises generating a private key in response to using said public encoding key, wherein said private key is used as a decoding key to automatically decode the media file.

17. The non-transitory computer-readable storage medium of claim 14, wherein said encoding further comprises:
parsing said media file to identify bits of the media file that correspond to said identified portion; and
applying said encryption software to said identified bits, said application comprising modifying said bits based on said encoding key, said modification resulting in said obfuscation.

18. The non-transitory computer-readable storage medium of claim 14, wherein said encoding further comprises:
embedding content associated with the encoding key in the media file in association with a location of the identified portion, wherein said display of the encoded media file content comprises displaying said embedded content.

19. A computing device comprising:
a processor;
a non-transitory computer-readable storage medium for tangibly storing thereon program logic for execution by the processor, the program logic comprising:
logic executed by the processor for identifying a media file comprising digital media content;
logic executed by the processor for receiving an input associated with said media file, said input comprising information identifying a portion of the digital media content of the media file;
logic executed by the processor for automatically encoding, in response to said input, said media file, said encoding comprising the computing device applying an encoding key via software defined by an encryption algorithm to the identified portion of the media file, said application of the encoding key via software defined by the encryption algorithm causing the media file to be modified such that only the identified portion of digital media content is obfuscated; and
logic executed by the processor for communicating, over a network, said encoded media file to a user, said communication causing a display of the encoded media file in a modified manner, said display comprises display of the media file content such that the modified media file content is displayed in a visibly obfuscated manner, and unencoded portions of the media file are not visibly obfuscated.

20. The computing device of claim 19, further comprising:
- logic executed by the processor for storing information associated with the identified portion, a set of users designated with permissions to view said portion and the encoding key in a look-up-table in a database;
- logic executed by the processor for receiving, from the user, a request to decode the encoded media file content, said decoding request comprising information to be used to authenticate said user; and
- logic executed by the processor for determining, based on said decoding request, whether to authenticate said user, said determination comprising:
  - upon a determination that said user is authenticated:
    - automatically decoding the media file based on said decoding request; and
    - communicating unencoded content associated with the identified portion to said user;
  - upon a determination that said user is not authenticated, declining said decoding request.

* * * * *